(12) United States Patent
Dabet et al.

(10) Patent No.: US 7,849,398 B2
(45) Date of Patent: Dec. 7, 2010

(54) DECISION CRITERIA FOR AUTOMATED FORM POPULATION

(75) Inventors: Sebastien Dabet, Grenoble (FR); Marco Bressan, Grenoble (FR); Hervé Poirier, Meylan (FR)

(73) Assignee: Xerox Corporation, Norwalk, CT (US)

( * ) Notice: Subject to any disclaimer, the term of this patent is extended or adjusted under 35 U.S.C. 154(b) by 894 days.

(21) Appl. No.: 11/789,823

(22) Filed: Apr. 26, 2007

(65) Prior Publication Data

US 2008/0267505 A1    Oct. 30, 2008

(51) Int. Cl.
G06F 17/27    (2006.01)
(52) U.S. Cl. .................. 715/226; 715/221; 715/224; 382/309; 382/310
(58) Field of Classification Search ................. 715/221, 715/224, 226; 382/309, 310
See application file for complete search history.

(56) References Cited

U.S. PATENT DOCUMENTS

| | | | | |
|---|---|---|---|---|
| 5,455,872 A | * | 10/1995 | Bradley | 382/228 |
| 5,805,747 A | * | 9/1998 | Bradford | 382/310 |
| 5,963,966 A | * | 10/1999 | Mitchell et al. | 715/236 |
| 6,192,380 B1 | | 2/2001 | Light et al. | |
| 7,058,567 B2 | | 6/2006 | Aït-Mokhtar et al. | |
| 7,120,302 B1 | * | 10/2006 | Billester | 382/229 |
| 7,305,129 B2 | * | 12/2007 | Chellapilla et al. | 382/174 |
| 2002/0131636 A1 | * | 9/2002 | Hou | 382/181 |
| 2003/0074187 A1 | | 4/2003 | Aït-Mokhtar et al. | |
| 2003/0163782 A1 | | 8/2003 | Owen | |
| 2004/0010758 A1 | | 1/2004 | Sarkar et al. | |
| 2004/0205526 A1 | | 10/2004 | Borodovski | |
| 2004/0205530 A1 | | 10/2004 | Borg | |
| 2005/0198563 A1 | | 9/2005 | Kristjansson | |
| 2005/0257148 A1 | | 11/2005 | Goodman et al. | |

FOREIGN PATENT DOCUMENTS

| EP | 1 580 666 | 9/2005 |
|---|---|---|
| EP | 1 796 019 | 6/2007 |

OTHER PUBLICATIONS

U.S. Appl. No. 11/299,453, filed Dec. 12, 2005, Bressan, et al.
C.Handley, A.M. Namboodiri, R.Zanibbi, *Document Understanding System Using Stochastic Context-Free Grammars*, Proceedings of the Eighth International Conference on Document Analysis and Recognition, pp. 511-515, (2005).
S.Aït-Mokhtar, J.P.Chanod, C.Roux, *A Multi-Input Dual-Entry Point Dependency Parser*, Proceedings of the Seventh International Workshop on Parsing Technologies, Beijing, China, Oct. 17-19, 2001.

* cited by examiner

*Primary Examiner*—Stephen S Hong
*Assistant Examiner*—I-Chan Yang
(74) *Attorney, Agent, or Firm*—Fay Sharpe LLP

(57) ABSTRACT

A method is provided for selecting fields of an electronic form for automatic population with candidate text segments. The candidate text segments can be obtained by capturing an image of a document, applying optical character recognition to the captured image to identify textual content, and tagging candidate text segments in the textual content for fields of the form. The method includes, for each of a plurality of fields of the form, computing a field exclusion function based on at least one parameter selected from a text length parameter, an optical character recognition error rate, a tagging error rate, and a field relevance parameter; and determining whether to select the field for automatic population based on the computed field exclusion function.

25 Claims, 4 Drawing Sheets

DECISION CRITERIA FOR AUTOMATED FORM POPULATION

CROSS REFERENCE TO RELATED PATENTS AND APPLICATIONS

The following copending application, the disclosure of which is incorporated herein by reference in its entirety, is mentioned:

application Ser. No. 11/299,453, filed Dec. 12, 2005, entitled PERSONAL INFORMATION RETRIEVAL USING KNOWLEDGE BASES FOR OPTICAL CHARACTER RECOGNITION CORRECTION, by Bressan, et al.

BACKGROUND

The exemplary embodiment relates to the information arts. It relates especially to a method and an apparatus for populating a form with textual information extracted from a physical document, and will be described with particular reference thereto.

Many business-related forms are now in electronic format. In some cases, the information for filling in these forms is present in a printed document. For example, an electronic form for inputting information relating to a book may include fields such as author, title, ISBN number, publisher, and dates. Forms also exist for inputting information from business cards, IDs, correspondence, and other physical documents so that the information is available in electronic format.

Optical character recognition (OCR) techniques employ software which extracts textual information from scanned images. Such techniques have been applied to extract textual information from books, business cards, and the like. Once text is extracted, each text line can be tagged as to data type. The extracted information can be used to pre-fill corresponding fields in an electronic form. Other information may be input manually. For example, when capturing a business card or an ID, personal data may be extracted by tagging text lines as "personal name," "job title," "entity affiliation," and so forth. The tagged personal data can be used to populate a form, such as a new contact form, which can then be incorporated into a contacts database. Corporate mail rooms may also use such techniques to provide a database by completing forms with information extracted from incoming mail.

OCR techniques used for form population invariably result in some errors, both in the recognition of the individual characters in the digital document and in the correct association of the extracted information with specific fields of the form (tagging). However, manual input of information is time consuming and also generally incurs errors.

It would be desirable to provide a method for populating an electronic form which aims to minimize the time required for completion of the form, while at the same time, considering the potential for errors in the process.

INCORPORATION BY REFERENCE

The following references, the disclosures of which are incorporated herein in their entireties by reference, are mentioned.

US Pub. No. 20030163782, published Aug. 28, 2003, entitled FORM DATA ENTRY SYSTEM, by Benjamin K. Owen, discloses a form information input system that uses a form software program used to make customized "fill-in-the-blank" forms on a host computer. The system generates a question for each field. The answer given by the user is stored to complete the form.

U.S. Pub. No. 20040205526, published Oct. 14, 2005, entitled PROMPTED FORM FILLING MECHANISM, by Vadim Borodovski, discloses a prompting form-fill mechanism which interactively populates data fields on electronic forms or other documents from prestored data fields.

U.S. Pub. No. 20040205530, published Oct. 14, 2004 entitled SYSTEM AND METHOD TO AUTOMATICALLY COMPLETE ELECTRONIC FORMS, by Michael J. Borg. discloses a method and apparatus for completing a document in accordance with a blank tabularized form document from data automatically retrieved from a database. An image of the blank form document is read into the system as image data from which a format of the blank form document and key information is determined.

U.S. Pub. No. 20050257148, published Nov. 17, 2005, entitled INTELLIGENT AUTOFILL, by Joshua T. Goodman, et al., discloses a system for a computer network that can employ machine learning techniques to automatically fill one or more fields across a diverse array of web forms.

U.S. Pub. No. 20050198563, published Sep. 8, 2005, entitled ASSISTED FORM FILLING, by, Trausti T. Kristjansson, discloses a method which facilitates assisting a user in filling forms. The system identifies elements in untagged media to populate a form and indicate to the users when fields require a manual review.

U.S. Pat. No. 7,058,567, issued Jun. 6, 2006, entitled NATURAL LANGUAGE PARSER, by Aït-Mokhtar, et al., discloses a parser for syntactically analyzing an input string of text. The parser applies a plurality of rules which describe syntactic properties of the language of the input string.

BRIEF DESCRIPTION

In accordance with one aspect of the exemplary embodiment, a method for selecting fields of an electronic form for automatic population with candidate text segments that are obtained by capturing an image of a document, applying optical character recognition to the captured image to identify textual content and tagging candidate text segments in the textual content for fields of the form. The method includes, for each of a plurality of fields of the form, computing a field exclusion function based on at least one parameter selected from a text length parameter, an optical character recognition error rate, a tagging error rate, and a field relevance parameter. A determination is made as to whether to select the field for automatic population based on the computed field exclusion function.

In another aspect, a method for populating a form includes capturing an image of a physical document, applying optical character recognition to the captured image to identify textual content, tagging candidate text segments in the textual content for fields of the form, and automatically populating a field of the form with the tagged candidate text segment if the field is designated as an automatically populated field, otherwise leaving the field blank. The designation of the field as automatically populated or not depends on at least one of a text length parameter, a tagging error rate, an optical character recognition error rate, and a field relevance parameter.

In another aspect, an apparatus for populating a form includes an optical character recognition engine configured to identify textual content in a captured image of a hardcopy document. A tagging module tags candidate text segments in the textual content for population of fields of a form to be populated. A field exclusion module, for each of a plurality of fields of the form, designates the field as a manual entry field or an automatically populated field, based on a field exclusion parameter, and automatically populates the fields designated as automatically populated fields, leaving the manually populated fields blank. The field exclusion parameter is a function of at least one of a tagging error rate, an optical character recognition error rate, and a field relevance parameter.

In another aspect, a graphical user interface is configured to display a form in which fields are designated as manually populated or automatically populated based on a determination of manual correction and manual entry times for the field and a relevance of the field. The graphical user interface is configured for populating those fields designated as automatically populated with candidate text segments derived from a captured image of a document and for leaving fields blank that are designated as manually populated.

DETAILED DESCRIPTION

Figure 1:
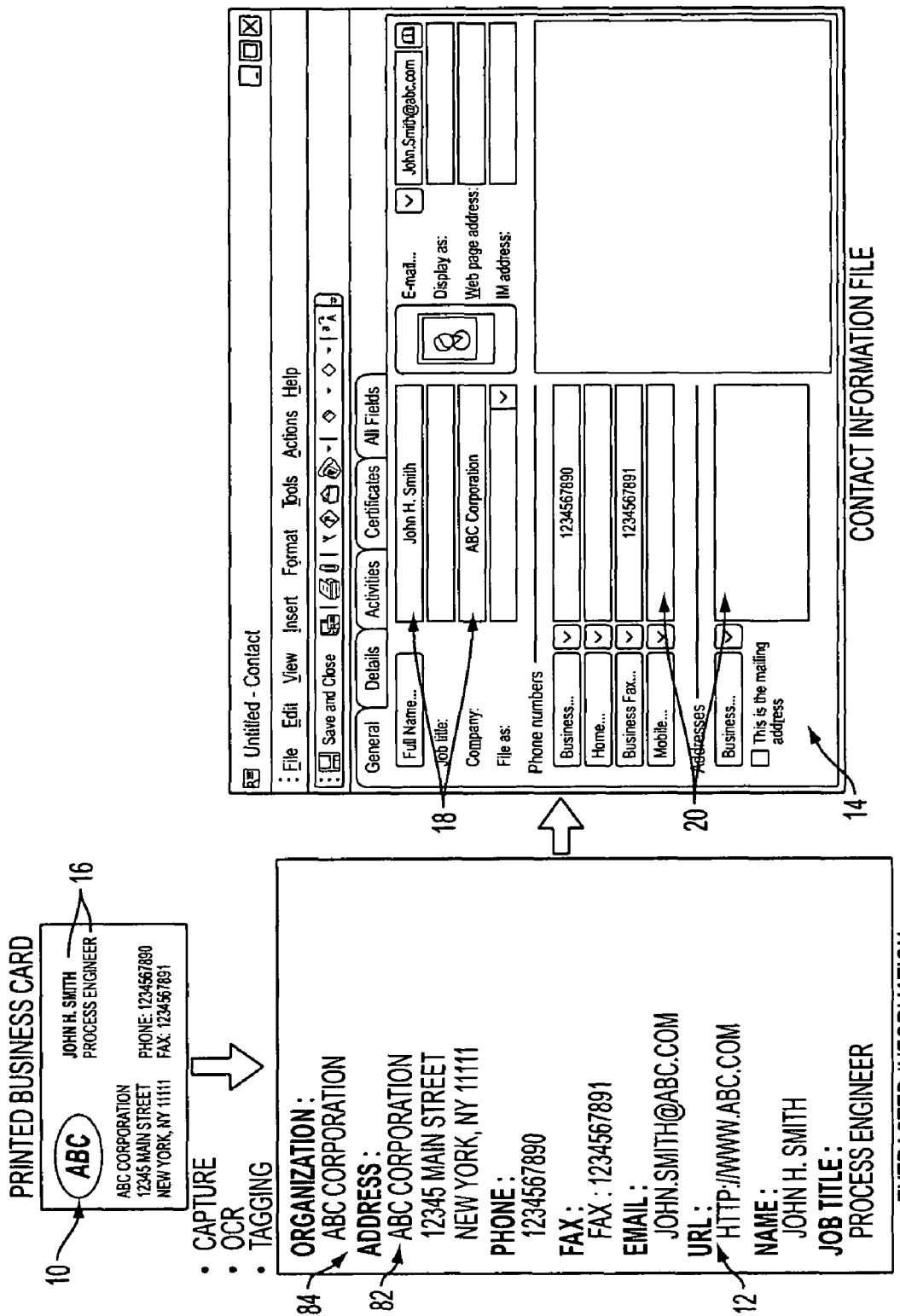
FIG. 1 is a schematic illustration of the extraction of textual segments from an exemplary physical document in the form of a business card, and the population of selected fields of a form in accordance with the exemplary embodiment.

Aspects of the exemplary embodiment relate to apparatus and method for automatic form filling and to a method for identifying fields of a form for automatic population.

In various aspects, the method allows for automated tagging of fields of a form whereby only the fields that the user would want to check and perhaps correct (based on factors such as error rates and importance of the field) are presented to the user for manual entry or correction. The method thus aims at providing an optimal post-correction time.

Automated form filling, as described herein, involves the population of at least some of the fields of a form with information derived from a digital document. Automated form filling from information contained in a printed document typically involves digitalization, OCR, and entity recognition followed by tagging text segments of the OCR'd output according to the appropriate fields of the form with which the text segment is determined to be applicable. Because both OCR and tagging can introduce errors in the form content, a manual correction stage is typically employed. An optimal correction approach in terms of time requirements and final accuracy depends on the OCR precision and tagging precision, user interface, and form characteristics. The exemplary method enables a decision to be made as to whether or not to populate a given field automatically based on one or more factors. Such factors may include one or more of precision (or error)-related factors, field attributes (such as relative importance that the field is accurately completed), and efficiency (such as user convenience and relative times taken for manual entry vs. manual correction) factors. The exemplary system and method enable a decision to be computed for each of a plurality of fields of a form. Based on the decision, the field may be automatically populated with tagged information or left blank for a user to complete manually.

One of the decisions involved in the correction stage is thus whether or not to fill in a form field with tagged information and allow the user to correct the result. This decision can be seen as an application specific post-correction stage of the exemplary method.

In various aspects, the exemplary method modifies automated tagging results in an optimal way for user post-correction. The exemplary method determines whether given fields in a form should be filled with information automatically extracted from the document and form features or not. The decision on filling in the field makes the process more convenient than manual entering from the user's perspective, taking into account error probabilities, time to type an entry and field attributes. In particular, a field relevance weight is introduced as a basic attribute for this decision.

By way of example, the exemplary method is described in terms of filling in a form with personal contact information from a printed business card. However, the method finds application in any form filling process, particularly those involving the completion of a large number of forms, where the time and precision benefits are most apparent.

The exemplary method simplifies and reduces the time required for the process of filling in a form from a physical text document. In various aspects, the method prevents users from spending time correcting errors in a low-relevance field while automatically evaluating for high-relevance fields whether the correction of the extracted information is more convenient and reliable than manual entry.

FIG. 1 illustrates an exemplary physical document, in the form of a business card 10, exemplary digital information 12 which may be extracted from the business card, and an exemplary electronic form 14, here shown as a contact information file, which may be displayed to an operator. The electronic form is populated with at least some of the extracted information, while other fields are left blank for manual entry.

In the illustrated embodiment, the business card 10 is a physical card, such as a 5×8.5 cm business card or similar-sized business card that is commonly carried by business and professional persons. However, it is to be appreciated that the method is equally applicable to automated form filling with information from other printed documents, such as incoming mail, medical records, identification cards, such as drivers' licenses, book and technical article information, such as author, title, ISBN number, publisher, dates, and so forth. The personal information content of business cards typically include personal name, job title, affiliation (such as a company name, university name, organization, or the like), business address information, business telephone number, business facsimile number, email address, and so forth, arranged in lines 16 of text, and may also include a graphical affiliation logo (such as a corporate logo, university logo, firm logo, and so forth). A given business card may include only some of these items or all of these items, and may include additional or other information.

As shown in FIG. 1, the exemplary form 14 includes a number of fields 18, 20, etc. which are to be populated with information extracted from the business card. Exemplary fields for a form 14 to be populated with information from business cards such as business card 10 may include "person name," "job title," "company name," "business phone number," "home phone," "business fax number," and the like. The fields of the form 14 may each be designated, during the course of the method, as an automatically populated field 18, to be automatically populated with information, or a manually populated field 20, to be manually populated by a user. The fields to be manually populated 20 may be highlighted in some way to distinguish them from the automatically populated fields 18. The automatically populated fields 18 are generally fields for which the user is able to modify the content, either by deleting the entire content and typing in the entire content of the field, or by correcting content of an automatically populated field, where appropriate. Fields 20 designated manually populated are not populated, but are to be filled in by the user, and may be highlighted with a different color. The designation of the fields of a form as automatic/manual is based on a number of features. Some of the features are error-related features which take into account the likelihood for errors in populating the field. Other features which can be used in the designation of a field may include target field attribute features (average content length, type, etc., which may be computed on a sample set, and field relevance, which is particularly useful), efficiency attribute features, such as interface attributes (insertion and correction times) and target field attributes. The method includes assigning parameters to some or all of these features and basing the decision on a computed function which is based on these parameters.

Figure 2:
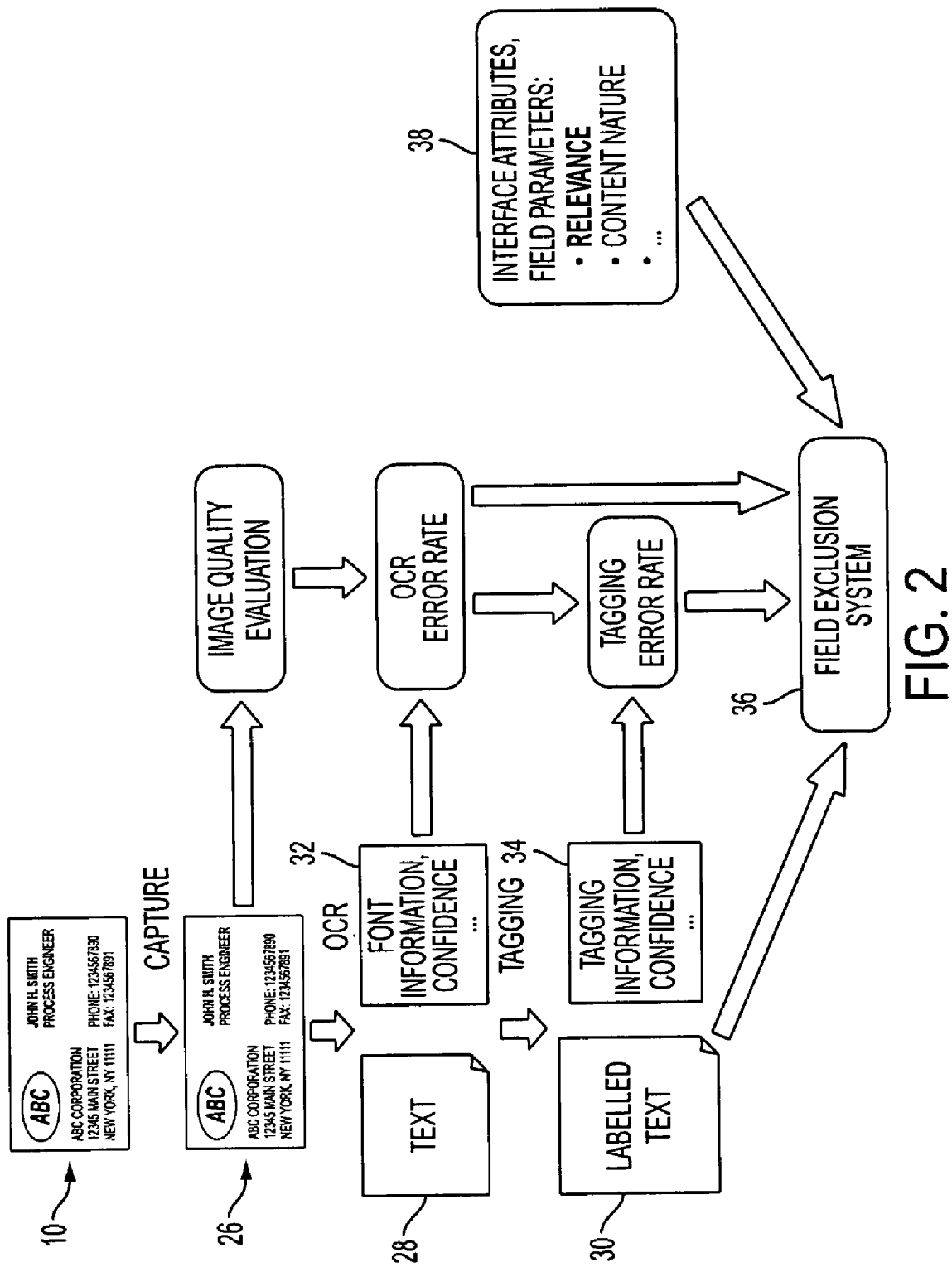
FIG. 2 illustrates sources of error in automatic population of a form.

FIG. 2 graphically illustrates sources of error which may arise in populating an electronic form, such a form 14, when the document 10 is scanned to generate a captured document 26, OCR processed to generate text 28, and tagged to generate labelled text 30. Errors in automated form filling can arise from a number of sources, including OCR character recognition errors 32, tagging errors 34 (incorrectly associating information with a specific field), as well as manual errors arising from incorrectly entering information or correcting automatically entered information. A field exclusion system 36 takes these and other features 38 into account in determining whether it is more efficient to automatically populate a given field or to exclude it i.e., leave it blank for manual entry.

The error rates associated with OCR and tagging, for example, affect the average time which is typically required for manual correction. For example, it may take a user an average of 2.5 minutes, working on a computer, to manually enter all of the information required for a particular electronic business card contact form. Assuming a scanner has a global OCR error rate of 2% and there is a tagging error rate of 15% for a given business card 10, it may take an average of 1 minute to make all the post-corrections that the user considers necessary from the automatic output, working on a desktop computer or laptop. In this example, automatic form filling followed by manual correction is approximately 2.5 times faster than manual completion of the entire form. By comparison, in the case of a mobile telephone with a low resolution phone camera serving as the image capture device, the global OCR error rate may be higher, e.g., about 6%, and the tagging error rate may be about 25% for a given card 10. In this case, it may take a user an average of about 5 minutes to manually enter all the information using the phone keypad or 3 minutes to make all the post-corrections that the user considers necessary. In this case, automatic form filling followed by manual correction is approximately 1.66 times faster than manual completion of the entire form. The number and type of fields a user may enter in a card of a contact manager also depend on the device used. For example, a business card entered in a desktop contact manager generally contains at least the given name, surname, phone number, email address, and business address. When the same business card is entered in a contact manager of a telephone, the user may only need the name and phone number. As will be appreciated from these examples, the actual time savings for any given form may be strongly dependent on the user interface, the image capture device, and the OCR processing and tagging capabilities, and other requirements.

Table 1 below summarizes some candidate features which may be utilized in the exemplary method for assigning a field designation to a field of a form.

TABLE 1

| FEATURE | NOTATION |
| --- | --- |
| Image and Capture attributes | Iq |
| Text attributes | A |
| Interface attributes | K |
| Field attributes | F |
| Field relevance | $W \in [0, 1]$ |
| OCR error rate | $E_o \in [0, 1]$ |
| Tagging error rate | $E_t \in [0, 1]$ |

Where a feature represents more than one attribute, each of the attributes may be accorded parameters, such as a name and a value. Each of the values, either independently or in combination, may be used in a determination of whether a field is to be automatically populated. Alternatively, the attributes of a feature may be combined into a vector or other representation which is used in determining whether to populate a given field. As will be appreciated, many of these attributes may assume a range of values and may be represented in the assigned parameter by a statistically determined average value (e.g., mean value) or otherwise estimated value.

The image/capture attributes feature Iq may incorporate image quality attributes of the device used in capturing the images, such as the resolution, noise, lens quality of the capture device, and the like. In general, the parameter or parameters assigned to this feature remain constant for a given image capture device and thus may affect all fields equally.

The text attributes feature A may incorporate text attributes of the captured image (or typical captured images), such as font size, font type, layout, and the like. These attributes may influence the overall OCR error rate and tagging error rate. Thus, for example, if the font is small or of a type which is not easily recognized by the OCR, the assigned parameter may weigh against automatic population of a field if the estimated correction time is higher than the manual entry time.

The interface attributes feature K may incorporate predicted alphanumeric/numeric insertion and correction times for a particular user interface. For example, a mobile phone is more time consuming to operate than a computer keyboard and thus K may be different for these two types of interface. The feature may also incorporate user preferences, such as whether a user likes to have a field left blank, or prefers to correct a pre-filled field. If a user prefers to fill in a field rather than correct it, the parameter assigned to this feature may weight the decision against automatically populating a field.

The field attributes feature F may incorporate content-based attributes of a field, such as content length, content type, and the like. In one embodiment, the field attributes feature F is a function of the average length of the content of the field (e.g., according a length 1 for each character). For example, $F = F_{length}$ = the average content length of the particular field of a form. The value of the text length parameter $F_{length}$ may be estimated, for each field of the form, by averaging the length of correctly tagged entries from a representative sample of documents of the type being captured, such as business cards.

The field relevance feature W has a value which indicates the importance of any given field within a form and can be a continuous or binary measure. A binary measure (i.e., 0 or 1) may be appropriate in forms which contain both optional and required fields. Required fields may be accorded a relevance of 1 and optional fields a relevance of zero, for example. In general, for a given electronic form, an administrator assigns a field relevance value W to each field. A higher value may be assigned to the field relevance parameter W if the field is designated as a required field, i.e., one which is required to be populated, as opposed to an optional field. The field relevance may reflect the intended use of a form, for example, if the form will be used primarily for telephone or email contact, the home telephone number field may be considered of low relevance. The field relevance may take into account whether or not the information has to be correct to be of value, for example, a telephone number will be of no value if even one number is incorrect, whereas a user of the database may be able to discern the job title if it is incorrectly entered as "Probuct Engineer" in place of "Product Engineer." Another way of computing the relevance of each field is to learn from the user preferences. For example, when a user enters text in a field in a contact form, the corresponding field relevance W may be increased and when a field is left blank, the field relevance is lowered.

The OCR error rate $E_o$ represents the prevalence of errors arising from the OCR process. The error rate may be expressed as a proportion of the characters which are expected to be erroneously identified, on average. This may be determined statistically for each field of the form. For example, the "person name" field may be assigned a relatively low OCR error rate $E_o$ because the name of the person is typically in a larger font than is used for other fields and/or is printed in a clear type font. The OCR error rate $E_o$ may be further refined by using OCR confidence, e.g., as output by the OCR device, for a particular document. The OCR error rate may be a value which varies between 0 and 1, where 0 corresponds to no likelihood of error in correctly recognizing the characters for a field and 1 corresponds to no likelihood of success in correctly recognizing the characters.

An OCR error rate $E_o$ may be assigned to each field of the form, whereby some fields have higher or lower error rates than other fields. The error rates $E_o$ may be average values, determined by scanning a set of documents of the type to be used in completing the form, manually evaluating identifying the errors, and computing a mean value for a given field. In other embodiments, the OCR error rate may be an average error rate for the particular capture device, i.e., the same value for each field of a form.

The tagging error rate $E_t$ represents the prevalence of errors arising from incorrectly tagging a sequence of OCR'd text. The tagging error rate may be function of one or more parameters, including OCR quality and content type (alphanumeric, numeric, etc.). The estimation of tagging error may be further refined by using tagging confidence, e.g., as output by the OCR device. The tagging error rate may be a value which varies between 0 and 1, where 0 corresponds to no likelihood of error in matching a text segment to its correct field and 1 corresponds to no likelihood of success in matching a text segment to a correct field.

As for the OCR error rate $E_o$, the tagging error rate $E_t$ may be determined by manual review of documents tagged by the system, an assessment of whether the field includes the correct line of text, and a computation of the accuracy. In this case, each field has its own error rate which represents an average probability that the text attributed to this field actually belongs to another field. Some fields which have a very specific content, such as zip code or address, will have a low tagging error rate, whereas some other fields whose content is generally very close to other ones (typically fax number and phone number) may have a larger tagging error rate. In other embodiments, the tagging error rate may be an average tagging error rate, i.e., the same value is assigned for each field of a form.

In general, the designation of a field as manually/automatically populated is a function of some or all of these parameters. Some of the parameters may be given greater weight than others.

It is to be appreciated that some of the fields of a form may be designated by other means than the exemplary system of field exclusion. For example, some fields may be designated through user preferences alone.

Figure 3:
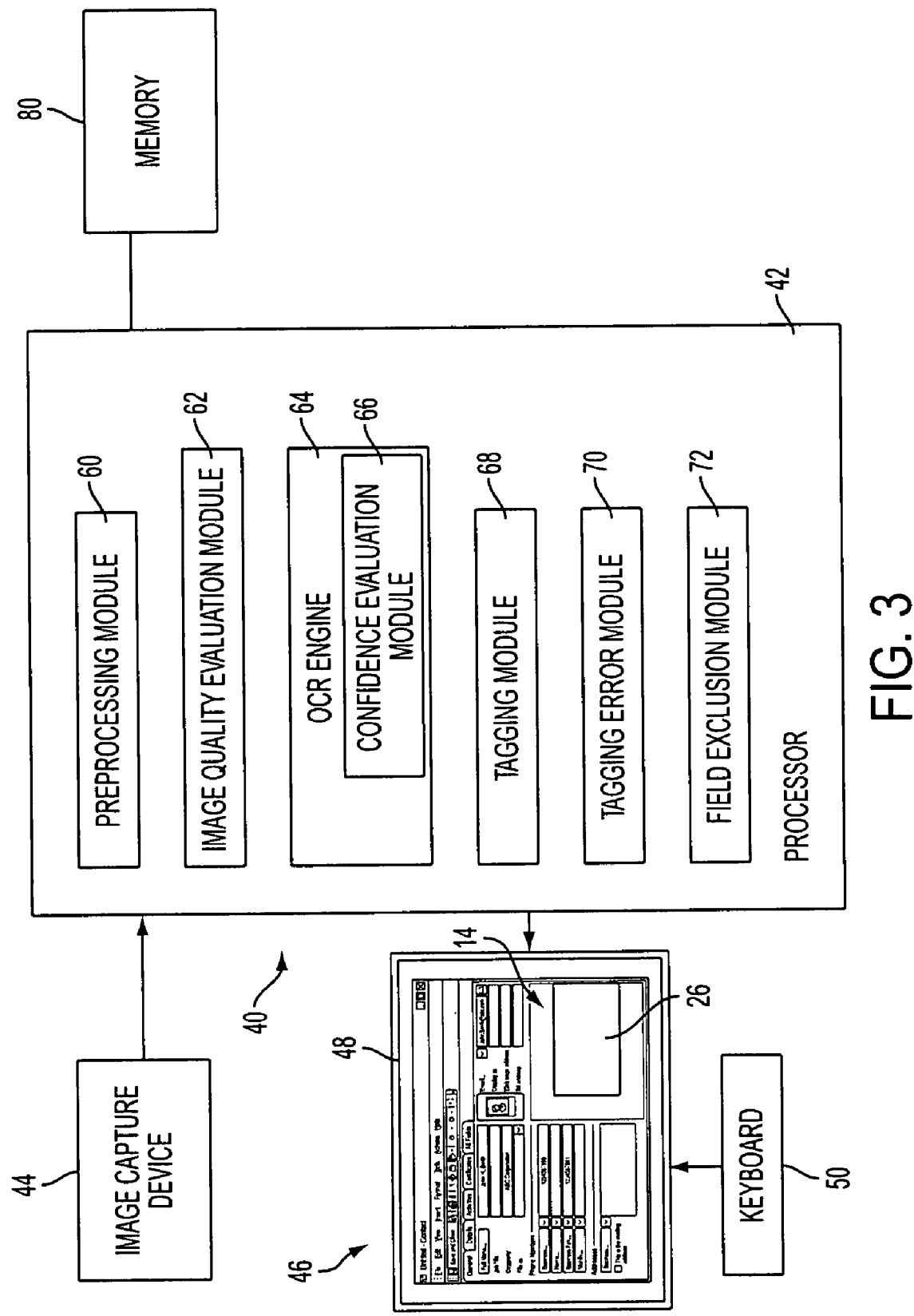
FIG. 3 is a functional block diagram of an exemplary apparatus for population of electronic forms with text segments derived from a physical document.

FIG. 3 illustrates an exemplary apparatus 40 for populating an electronic form in accordance with the exemplary method described in greater detail below. The apparatus includes a processor 42 which is illustrated as incorporating a number of processing modules, although it is to be appreciated that functions of two or more of the modules may be combined and/or that the modules need not all reside in the same physical location.

An image capture device 44, which may be incorporated into apparatus 40, or may be a separate device, captures an image of a physical document, such as business card 10. The capture device 44 may be a digital camera, a scanner, a phone camera, or other device which provides a digital image of the physical document. The image quality of the captured image may depend on several factors such as lens quality, lighting conditions, sensor resolution, and the like. The captured image is processed by the processor 42.

A user interface 46, herein illustrated as a graphical user interface (GUI) is in wired or wireless communication with the processor 42. The illustrated user interface 46 includes a display 48, such as an LCD screen or computer monitor, for displaying a form during its population and which may also provide a side by side view of the captured image 26, such as the captured image of business card 10. The user interface 46 also includes a user input device 50, such as a keyboard, keypad, touch screen, cursor control device, or combination thereof, which permits interaction of a user with the user interface 46.

The processor 42 may include a number of processing modules 60, 62, 64, 66, 68, 70, 72, which execute instructions stored in associated memory 80 for performing the exemplary method. The processor 42, and optionally also memory 80, image capture device 44 and/or user interface 46, may be embodied in a general purpose computing device, such as a desktop or laptop computer, palmtop computer, or portable digital assistant (PDA). Or, the processor 42 may be incorporated into a device with computing capability, such as a digital camera, cellular telephone with picture taking capability, pager, scanning device, printer, or the like. In yet another embodiment, the GUI displays the form to be completed in a web browser and communicates with the processor 42 via a computer network, such as a local area network (LAN) or wide area network (WAN), such as the Internet.

Particularly in the case of a general purpose computing device, the processing modules 60, 62, 64, 66, 68, 70, 72 may be in the form of add-on software or hardware. The various components 42, 44, 46, 80 of the computer may be all connected by a bus (not shown). As will be appreciated, only a portion of the components which are incorporated into a computer system are shown in FIG. 3. Since the configuration and operation of programmable computers and computer networks are well known, they will not be described further.

The memory 80 may represent any type of computer readable medium such as random access memory (RAM), read only memory (ROM), magnetic disk or tape, optical disk, flash memory, or holographic memory. While a single memory is shown, it is to be appreciated that memory 80 may be distributed throughout the system. In some embodiments, the processing modules and memory 80 may be combined in a single chip. Captured images, OCR-processed data, tagged information, structure of the form to be populated, including fields to be populated, and the like may also be stored in memory 80.

One of the processing modules may be an image preprocessing module 60, which performs selected image pre-processing on the acquired business card image 26. Such preprocessing may include, for example, squaring of the image, re-sizing the image, performing a blurring correction, shadow correction, reflection correction, or other correction, converting the business card image to black-and-white, performing image compression, or so forth. In some embodiments, the image preprocessing module 60 is incorporated as software into processor 42 or may execute on a network server, personal computer, or other computer in communication with processor 42 via suitable wired or wireless link. In other embodiments, the preprocessing module 60 may be incorporated into the image capture device 44.

Optionally an image quality evaluation module 62 may evaluate the quality of the acquired (optionally preprocessed) image and/or of typical images of documents which are to populate the form. The image quality evaluation module 62 may take as input, image quality information from the image capture device 44 and/or image preprocessing module 60, such as lens quality, lighting conditions, sensor resolution, and the like. Alternatively, some or all of this information may be stored in associated memory 80. The image quality evaluation module 62 outputs one or more image quality parameters based on the image quality information. The information may be associated in memory with information about the capture device whereby appropriate parameters may be retrieved when a new document is captured with a known capture device.

An optical character recognition (OCR) module 64 processes the captured and optionally preprocessed image to extract information. In general, the OCR module 64 extracts the text characters contained in the image and may also provide layout and font information. The OCR module outputs a text file 28 comprising characters, their positions, and font sizes. These features may be combined to form a document representation of lines of text and separators. For example, the document representation output by the OCR module is broken down into a series of text segments 82 (FIG. 1). Each segment 82 may correspond to a line of text in the business card image. For the business card 10 of FIG. 1, for example, the segments 82 may include the following text segments: "John H. Smith," "Process Engineer," "ABC Corporation," "12345 Main Street," and "New York, N.Y. 11111," (assuming the OCR module has correctly identified the line information and characters). The OCR output may be encoded in XML or other markup language format.

The OCR module 64 operates based on a pattern recognition algorithm or algorithms which identify characters based on matching with expected character shapes. Errors or uncertainty in the output of the OCR processing can be expected to occur due to various factors, such as: less than ideal match between a printed character and the expected pattern; non-optimal image quality; short or usual textual content such as names and addresses; difficult-to-match fonts having substantial flourishes or other artistic features; and so forth.

To resolve uncertainties, the OCR module 64 optionally utilizes additional information or post-conversion processing such as a spelling checker, a grammar checker, and the like. However, because the content of business cards typically includes personal names, addresses, and so forth that are not commonly found in dictionaries, and because the content of business cards is typically not laid out in grammatically proper form, attempts to resolve uncertainties using dictionaries or grammar checkers may not be particularly effective.

A confidence evaluation module 66 estimates the confidence that the output text information 28 is correct, based on an estimation of the image quality and text attributes (font size, layout, and the like). This confidence may be expressed as an assigned error rate $E_o$, e.g., as a function of a percentage of the characters which are expected to be erroneously identified, on average. The confidence evaluation module 66 may be a part of the OCR engine 64 or a separate module. In the case of a separate module, the confidence evaluation module 66 may receive information from the OCR module 64 for determining $E_o$. In this case, the OCR module may assign a confidence level for each field. In other embodiments, the assigned error rate $E_o$ may be based, at least in part, from information for a particular document, for example, based on the closeness of the pattern match for a tagged segment 82 and whether the OCR identified more than one candidate for the segment (or words within the candidate).

A tagging module 68 takes as input the output 28 of the OCR engine 64 and identifies candidate text segments for fields of the form. In particular, the tagging module 68 tags the OCR output to label its content. The tagging module 68 may label lines of text or other segments 16 as a sequence of tokens using regular expression matching. The maximum likelihood parse of this stream of tokens and separators yields a functional labeling of the document lines. For example, candidate text segments 82 are each tagged with a tag 84 (FIG. 1), representing a field of the form 14 which is determined to most likely correspond with the particular text segment.

The tagging module 68 can use various pieces of information in assigning tags to the text image segments 16. For example, the first line and/or the line with the largest font size is often the name of the person whose information is conveyed by the card, while address information often starts with one or more numerals.

Methods of tagging are described, for example in the following references, the disclosures of which are incorporated herein by reference: John C. Handley, Anoop M. Namboodiri, Richard Zanibbi, "Document Understanding System Using Stochastic Context-Free Grammars," Proceedings of the Eighth International Conference on Document Analysis and Recognition, pages: 511-515 (2005); Salah Aït-Mokhtar, Jean-Pierre Chanod, Claude Roux, (2001). "A Multi-input Dependency Parser," in Proceedings of the Seventh International Workshop on Parsing Technologies Beijing, China 17-19 October 2001 (IWPT-2001); and U.S. Pat. No. 7,058,567, incorporated herein by reference in its entirety. Exemplary technologies that can be applied in the tagging stage are stochastic context-free grammars, the Xerox Incremental Parser (XIP), and the like.

A tagging error module 70 assigns a tagging error $E_t$ for each field for which a token (or tokens) 82 is assigned.

A field exclusion module 72 determines whether a field 18, 20 of the form 14 should be automatically populated using the principles of the exemplary field exclusion system 36 outlined in FIG. 2. The decisions may be based on at least some of the features described with reference to Table 1 above. In particular, the module 72 may utilize tagging error and OCR error information obtained from modules 70 and 66.

Figure 4:
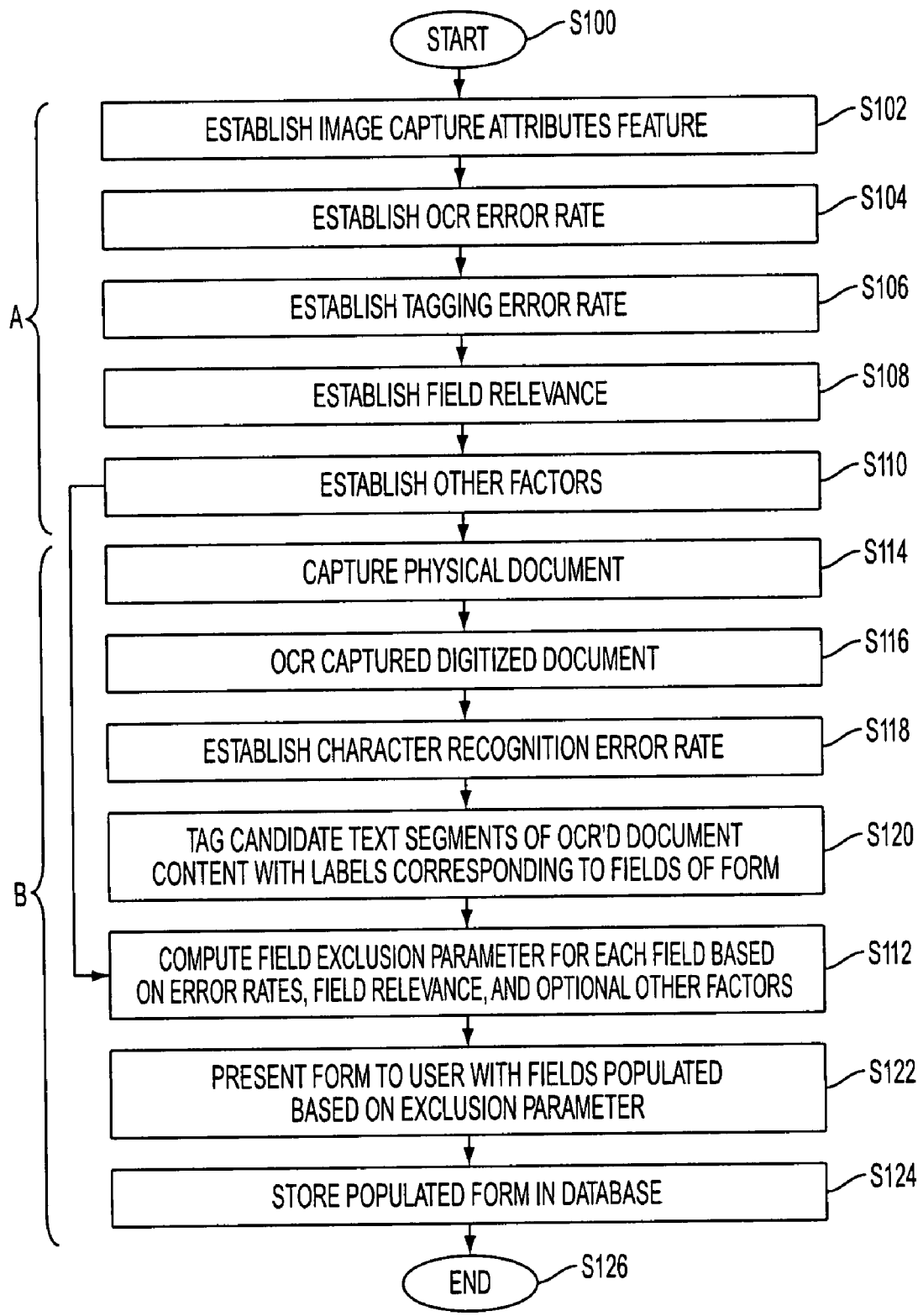
FIG. 4 illustrates an exemplary method for populating selected fields of a form in accordance with the exemplary embodiment.

FIG. 4 illustrates an exemplary method for populating a form which may be performed with the apparatus of FIG. 3. It will be appreciated that the exemplary method may include fewer, more or different steps from those illustrated and that the steps need not proceed in the order shown. The method begins at S100.

An initial stage A of the method may include establishing (e.g., determining or assigning) the parameters to be used the field exclusion module. At S102, an image capture attributes parameter Iq may be determined or otherwise assigned. This step may include acquiring image attributes, such as image quality, resolution of the capture device, etc., from the capture device 42, storing the attributes in memory, and determining an image capture attributes parameter Iq therefrom. Alternatively, a value of Iq may be retrieved from memory for the particular capture device.

At S104, an OCR error rate $E_O$ may be established for each field. This may be determined for each field, for example, where different fonts are used in the document, or a single value determined for the entire form. This step may include acquiring values of OCR attributes, storing them in memory, and determining an OCR error rate $E_o$ therefrom.

At S106, a tagging error rate $E_o$ may be established for each field. This step may include acquiring values of tagging error attributes, such as OCR quality, content type (alphanumeric, numeric, etc.), and tagging confidence, storing the values in memory, and determining the tagging error rate therefrom.

At S108, a field relevance parameter W may be established for each field.

At S110 other parameters, such as the text attributes parameter A, interface attributes parameter K, field attributes parameter F, may be determined/assigned.

At S112, designations for the fields of the form are determined, based on the determined parameters. In particular, a field exclusion function may be computed for each field and the field designated as manual or automatic based on the function. In particular, S112 may include, for each field, estimating an average manual correction time and a manual entry time and computing the field exclusion function therefrom. At the end of S112, each field of the form may be tagged with a designation as either automatic population or manual population.

The second stage B of the method, which may be performed after the field designations are established, includes populating the form. At S114, a physical document 10 is captured, e.g., by image capture device 44.

At S116, the captured image is optionally preprocessed, e.g., by preprocessing module 60.

At S118, the image is OCR processed to identify segments 82 of text and a sequence of characters in each segment.

At S120, candidate segments of text 82 are tagged—e.g., labeled with a reference to the corresponding field of the form 14.

At S122, the form 14 may be populated with the OCR extracted information according to the field designations. Those fields which are designated as automatically populated are populated automatically and may be highlighted in a first color. A prompt may be displayed which prompts a user to compare the field with the business card or displayed image thereof and to edit the content of the field if there are errors. Those fields designated as manually populated are left blank and may be highlighted in a second color. The user may be prompted to enter the information. For those fields designated as "not required," these may be highlighted in a different color or not highlighted, to indicate to the user that the field may be left blank.

At S124, the populated and optionally corrected form is stored and may be incorporated into a contacts database. The method ends at step S126.

As will be appreciated, in other embodiments, steps S102-S110 may be performed wholly or partially after capturing an image of the document (S114), so that attributes of the particular document that has been scanned may be taken into account in determining some or all of the parameters.

In determining the field designation, each field on the form 14 can be treated independently of the other fields. However, field dependence may be considered if appropriate.

The method illustrated in FIG. 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The field exclusion model 72 takes as input the parameters or attributes and automatically determines field designations for each of the fields. In one embodiment, the field designation is intended to minimize user interaction times. In the following discussion, M is the manual entry time, which represents the expected total time taken for full manual entry of the content of a field. C is the manual correction time, which represents the expected total time taken for manual correction of the content of a populated field. In the exemplary embodiment, it is assumed that all users perform corrections and manual entries in a similar manner. For example, no assessment of a particular user's typing ability is incorporated into the field exclusion model. However, it is contemplated that such factors could be incorporated through a machine learning approach.

Manual correction and entry times C, M for a field can be expressed as functions of the parameters identified above. In one exemplary model, manual entry time M for a given field depends only on field and interface parameters: M (F, K). Manual correction time C depends on OCR and tagging error rates and manual entry time: C ($E_o$, $E_t$, M, F, K). The reason manual correction time C depends on manual entry times is tagging. If the model decided to populate an incorrectly tagged field, since full deletion is required, the correction time C is almost equal to the manual entry time M. The number of times this can happen is given by the distribution of the tagging error rate $E_t$. Functions for computing C and M based on stored values of $E_o$, $E_t$, M, F, and K, may be stored in the memory. Where the same capture device is used for all forms, $E_o$ and $E_t$ may be assumed constant for a given field of a particular form.

One simple approach is to populate the field if the expected correction time C is less than the expected manual entry time M. Or inversely, to leave the field empty if the expected manual entry time M is less than the expected manual correction time C (C−M>0). More complex hypothesis testing procedures can also be used, as outlined below.

The simplified model described above does not consider field relevance W in the decision. In one embodiment, the decision seeks to avoid the user spending excessive time correcting an irrelevant (or unimportant) field. This model assumes that if a field is populated, the user will make sure that it is correct, even if it is not a required field, but if the field is left blank, the user will generally not fill in if it is a field with a low importance. However, if the difference between the manual correction time C and the manual entry time M is high (i.e., C<<M), then a decision may be made to automatically populate the field (the assumption here is that even if the field is not important, it probably will not contain an error and therefore will not make the correction process longer). This is achieved by taking the decision to leave the field empty if f(C, M, w)>0, where f is a function of the correction time, the difference between correction and manual entry times, and the relevance. For example, a field is left empty if:

$$C > (W \times T_D) + \alpha M$$

where $T_D$ is a unit of time which represents the time, on average, that a user is willing to pay for an important field (relevance 1), and $\alpha$ is a weighting factor which is a function of user preference In this embodiment, the maximum accepted time to correct an entry is controlled with 2 parameters. The value of $\alpha$ can be used to give a bias to specify whether the user generally prefers entering fields manually or correcting them. If a user prefers manual entry, a value of $\alpha$ which is higher than 1 may be used. A value of $\alpha$ may be stored in memory 80 for a given user (as identified for example, by the IP address of the user's computer) and retrieved when the exclusion function is being determined. $W*T_D$ gives the maximum accepted overhead to correct a field with a relevance W instead of manually entering it because, even if the entry contains some errors, it may avoid the user having to look back and forth between the printed and electronic versions.

The following provides an example of how a decision can be made. The following times can be defined.

$T_M$=average time to manually fill in an input unit
$T_R$=average time to read a unit
$T_C$=average time to correct a unit
$F_{length}$=the length value stored in the field attribute feature F.

Suitable values for these times can be assigned, based on typical user experiences with the type of user interface to be used. A unit corresponds to one character, such as a letter, digit, or space between other characters. The length value corresponds to the total number of units, on average, of the content of a particular field (when correctly tagged).

The Manual entry time M(F,K) can be considered to be a normal distribution with a mean, $\mu_M$:

$$\mu_M(F,K) = F_{length} \times T_M$$

In this assumption, manual entry time depends only on field length, since $T_M$ is a constant for a particular interface. A more complex hypothesis could take into account the interface properties and the text content attributes. For example, symbols not available on the normal keyboard could be assigned a higher unit time $T_M$.

The manual correction time $C(E_o, E_t, M, F, K)$ can be assumed to be a normal distribution with a mean $\mu_c(E_o, E_t, M, F, K)$ $\mu_c$ can be assumed to be the sum of Total Reading Time+ Total Editing Time. Total Reading time R is the estimated time taken for a person to read a populated field and is thus assumed to be proportional to the text length:

$$R = F_{length} \times T_R$$

Total editing time X is the estimated time taken for a person to edit a populated field and is dependent on errors. If the tagging is incorrect ($E_t=1$), the editing time will be almost the same as manual entering time ($\mu_M$) and if it is correct ($E_t=0$) then it will be proportional to the number of OCR errors (length multiplied by OCR error rate $E_o$) multiplied by the average time to correct a unit $T_c$:

$$X = (1-E_t) \times E_o \times F_{length} \times T_C + E_t \times \mu_M$$

So: $\mu_c(E_o, E_t, M, F, K) = F_{length} \times (T_R + (1-E_t) \times E_o \times F_{length} \times T_c + E_t \times \mu_M)$ The decision criterion for filling in the field is $$\mu_c < W*T_D + \alpha \mu_M$$

which means with the simplified model:

$$W > \frac{F_{length}(T_R + (1-E_t) \times E_o \times T_C + (E_t - \alpha)T_M)}{T_D}$$

As an example, assume that $\alpha=1$ (i.e., the user neither prefers manual entry nor correction) and:

$T_M=1s$
$T_D=5s$
$T_R=0.2s$
$T_C=5s$

Assume that three fields of the form: person name, company name, and facsimile number are assigned, e.g., by an administrator, field relevance factors W of 0.9, 0.8, and 0.2 respectively. Assume that the tagging module has identified text segments for these fields which have been identified as having average lengths of 12, 10, and 10 characters. Table 2 illustrates decisions for each of these fields.

TABLE 2

| FIELD | PERSON NAME | FACSIMILE NO. | COMPANY NAME |
|---|---|---|---|
| Relevance(W) | 0.9 | 0.2 | 0.9 |
| $F_{LENGTH}$ | 12 | 10 | 10 |
| OCR error Rate ($E_o$) | 0.1 | 0.2 | 0.2 |
| Tagging Error Rate ($E_t$) | 0.3 | 0.5 | 0.5 |
| Estimated Manual Entry Time (M) | 12 × 1 = 12 s | 10 × 1 = 10 s | 10 × 1 = 10 s |
| Correction time (C) | 2.4 + 4.2 + 0.36 = 6.96 s | 2 + 5 + 5 = 12 s | 2 + 5 + 5 = 12 s |
| f(C, M, W) = $\alpha M + W * t_D - C$ | (1 × 12 + 0.9 × 5) − 6.96 = 9.54 | 1 × 10 + 0.2 × 5 − 12 = −1 | 1 × 10 + 0.8 × 5 − 12 = 2 |
| Decision (fill if f(C, M, W) > 0) | Fill | Empty | Fill |

In the case of the facsimile number and company name, the predicted error rates are the same. However the relevance weight modifies the final decision: the company name has a high relevance weight and since this field needs to be filled in, even a text with errors can reduce the time to fill in the field.

In another embodiment, a more complex model may take into consideration the influence of target field content type). In this embodiment, the model may take into account the content type of the field, and more specifically the average proportion of digits in the field content: $F_{DIGIT}$ (this is a feature of the F attribute, the field-specific attribute). For example, the phone number field is expected to have a ratio of digits to field length near 1, whereas this digits/length ratio is almost 0 for the person name field. The influence of this parameter in the field exclusion processor depends on the input device: when using a desktop computer keyboard, for example the digit panel allows a very fast input for digits (this part of the keyboard is very easy to access and users generally do not need to look at the keyboard to press the keys), whereas on certain laptop computers, digit input is frequently longer than for common characters, since users have to press the shift key, and the location of the keys is near all other keys, so users have to pay attention during the input. As a consequence, the input time for a single unit $T_M$ (which is actually a feature of K, the vector of attributes which are specific to the input device) can be split into 2 different times: $K_{INSERT\_DIGIT}$ and $K_{INSERT\_OTHER}$ which represent the input times for a single digit and a single character other than a digit. This modification of the model has consequences on the manual entering time M, such as:

$$M(F,K)=F_{LENGTH}*(F_{DIGIT}* K_{INSERT\_DIGIT}+(1-F_{DIGIT})* K_{INSERT\_OTHER})(\text{instead of } M(F,K)=F_{LENGTH}*Tm)$$

Exemplary numerical values of these new parameters for typical interfaces can be as follows:

Desktop keyboard: $K_{INSERT\_DIGIT}$ =0.8 s and $K_{INSERT\_OTHER}$=1s

Laptop keyboard: $K_{INSERT\_DIGIT}$=1.2 s and $K_{INSERT\_OTHER}$=1s

Phone keypad:
In digit mode: $K_{INSERT\_DIGIT}$=0.8 s and $K_{INSERT\_OTHER}$=N/A
In text input mode: $K_{INSERT\_DIGIT}$=1.3 s and $K_{INSERT\_OTHER}$=1.2s The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 4, can be used to implement the method for populating a form.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for selecting fields of an electronic form for automatic population with candidate text segments that are obtained by capturing an image of a document, applying optical character recognition to the captured image to identify textual content, and tagging candidate text segments in the textual content for fields of the form, the method comprising:
for each of a plurality of fields of an electronic form, estimating a manual entry time and a manual correction time for the field, wherein the estimated manual entry time is an estimated time period for a user to enter a text segment into the field without automatic population and the estimated manual correction time is an estimated time period for a user to correct a text segment in the field after automatic population;
computing a field exclusion function based on the estimated manual entry time and the estimated manual correction time, the computation of the field exclusion function further based on at least one parameter selected from:
a text length parameter,
an optical character recognition error rate,
a computed tagging error rate, and
a field relevance parameter which has been assigned to a respective field; and
determining whether to select the field for automatic population based on the computed field exclusion function.

2. The method of claim 1, wherein the field exclusion function is also based on the field relevance parameter.

3. The method of claim 1, further comprising: for each of a plurality of fields of the form, assigning a relevance parameter to the field based on whether filling of the field is mandatory or not and wherein the field exclusion function is based on the assigned relevance parameter of the field.

4. The method of claim 1, wherein the optical character recognition error rate is estimated from information provided by an optical character recognition device.

5. The method of claim 1, further comprising for each of a plurality of the fields of the form, assigning an image capture parameter which accounts for image quality attributes of a device used in capturing the image, and wherein the field exclusion function is based on the image capture parameter.

6. The method of claim 1, further comprising for each of a plurality of the fields of the form, assigning a text attributes parameter based on text attributes and wherein the field exclusion function is based on the text attributes parameter.

7. The method of claim 1, further comprising for each of a plurality of the fields of the form, assigning an interface attributes parameter based on manual insertion and correction times for a selected user interface, and wherein the field exclusion function is based on the interface attributes parameter.

8. The method of claim 1, wherein the text length parameter for the field is based on an average length of text segments for that field obtained from a representative sample of documents.

9. The method of claim 1, wherein at least a first of the fields of the form is assigned a relevance parameter which differs from a relevance parameter of a second field of the form.

10. The method of claim 1, wherein the computing of the field exclusion function is performed prior to the tagging of candidate text segments in the textual content for fields of the form.

11. A method for populating a form comprising:
capturing an image of a physical document;
applying optical character recognition to the captured image to identify textual content;
tagging candidate text segments in the textual content for fields of the form;
for each of a plurality of the fields of the form, estimating a manual entry time and a manual correction time for the field, wherein the estimated manual entry time is an estimated time period for a user to enter a text segment into the field without automatic population and the estimated manual correction time is an estimated time period for a user to correct a text segment in the field after automatic population; and automatically populating a field of the form with the tagged candidate text segment if the field is designated as an automatically populated field, otherwise leaving the field blank, the designation of the field depending on the estimated manual entry time and manual correction time and at least one of:

a text length parameter, a predetermined tagging error rate, an optical character recognition error rate, and a field relevance parameter which has been previously assigned to that field.

12. The method of claim 11, further comprising:

for each of a plurality of fields of the form:

computing a field exclusion function which is based on the estimated manual entry time and manual correction time, the text length parameter, tagging error rate, optical character recognition error rate, and, optionally, the field relevance parameter, and determining whether to automatically populate the field of the form based on the field exclusion function.

13. The method of claim 12, further comprising: for each of a plurality of fields of the form, assigning a relevance parameter to the field and wherein the field exclusion function is based on the assigned relevance parameter of the field.

14. The method of claim 12, further comprising, establishing a tagging error rate and wherein the field exclusion function is a function of the tagging error rate.

15. The method of claim 12, further comprising, establishing an optical character recognition error rate and wherein the field exclusion function is a function of the optical character recognition error rate.

16. The method of claim 12, further comprising, at least one of:

computing an image capture attributes parameter based on image quality attributes of the captured image, and wherein the field exclusion function is a function of the image capture attributes parameter;

computing a text attributes parameter based on text attributes of the captured image, and wherein the field exclusion function is a function of the text attributes parameter;

computing an interface attributes parameter based on manual insertion and correction times for a selected user interface, and wherein the field exclusion function is a function of the interface attributes parameter.

17. The method of claim 11, further comprising identifying fields to the user for manual population, which are determined not to be automatically populated.

18. The method of claim 11, wherein the physical document comprises a business card.

19. An apparatus for populating an electronic form including a processor which performs the method of claim 11 and a graphical user interface which displays a form to be populated, the user interface displaying automatically populated fields for which a determination has been made by the processor to automatically populate the field.

20. A computer program product comprising a tangible computer-readable recording medium encoding instructions, which when executed on a computer causes the computer to perform the method of claim 11.

21. An apparatus for populating a form comprising:

memory which holds instructions for:

an optical character recognition engine configured to identify textual content in a captured image of a hardcopy document;

a tagging module which tags candidate text segments in the textual content for population of fields of a form to be populated; and a field exclusion module which for each of a plurality of fields of the form, designates the field as a manual entry field or an automatically populated field, based on a field exclusion parameter, and automatically populates the fields designated as automatically populated fields, leaving the manually populated fields blank, the field exclusion parameter being a function of a manual entry time and a manual correction time for a respective one of the plurality of fields, and at least one of a predetermined tagging error rate, an optical character recognition error rate, and a field relevance parameter which has been assigned to the field based on whether the field is mandatory or not, wherein the estimated manual entry time is an estimated time period for a user to enter a text segment into the field without automatic population and the estimated manual correction time is an estimated time period for a user to correct a text segment in the field after automatic population; and a processor which executes the instructions.

22. The apparatus of claim 21, further comprising at least one of:

a tagging error rate module which determines a tagging error for fields of the form; and an optical character recognition error rate module which determines an optical character recognition error rate for fields of the form.

23. The apparatus of claim 21, further comprising a graphical user interface configured for displaying the form with those fields automatically populated which have been designated by the field exclusion module as automatically populated fields.

24. The apparatus of claim 21, further comprising an image capture device which generates the captured image.

25. A graphical user interface configured to display a form in which fields are automatically designated as manually populated or automatically populated based on:

a determination of manual correction and manual entry times for the field, wherein the estimated manual entry time is an estimated time period for a user to enter a text segment into the field without automatic population and the estimated manual correction time is an estimated time period for a user to correct a text segment in the field after automatic population, average length of content of the field, and a relevance of the field;

the graphical user interface configured for populating those fields designated as automatically populated with candidate text segments derived from a captured image of a document and leaving fields blank that are designated as manually populated.

* * * * *